US012267576B2

(12) United States Patent
Choi et al.

(10) Patent No.: US 12,267,576 B2
(45) Date of Patent: Apr. 1, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventors: Jung hun Choi, Gyeonggi-do (KR); Dong Hyun Ha, Seoul (KR); Jae Wung Jung, Gyeonggi-do (KR)

(73) Assignees: Hyundai Motor Company, Seoul (KR); KIA Corporation, Seoul (KR)

( * ) Notice: Subject to any disclaimer, the term of this patent is extended or adjusted under 35 U.S.C. 154(b) by 240 days.

(21) Appl. No.: 17/845,276

(22) Filed: Jun. 21, 2022

(65) Prior Publication Data

US 2023/0122402 A1 Apr. 20, 2023

(30) Foreign Application Priority Data

Oct. 14, 2021 (KR) .................. 10-2021-0136473

(51) Int. Cl.
| | |
|---|---|
| *H04N 23/58* | (2023.01) |
| *B60R 1/28* | (2022.01) |
| *B60R 11/04* | (2006.01) |
| *B60W 10/20* | (2006.01) |
| *B60W 10/22* | (2006.01) |
| *H04W 4/40* | (2018.01) |

(52) U.S. Cl.
CPC ............... *H04N 23/58* (2023.01); *B60R 1/28* (2022.01); *B60R 11/04* (2013.01); *B60W 10/20* (2013.01); *B60W 10/22* (2013.01); *H04W 4/40* (2018.02); *B60W 2420/403* (2013.01); *B60W 2556/45* (2020.02); *B60W 2710/207* (2013.01); *B60W 2710/22* (2013.01)

(58) Field of Classification Search
CPC .......... H04N 7/181; H04N 23/58; B60R 1/28; B60R 11/04; B60R 1/00; H04W 4/40; B60W 10/22; B60W 10/20; B60W 2556/45; B60W 2420/403; B60W 2710/22; B60W 2710/207; G03B 1/00; G05D 1/00; G05B 1/00; B25J 1/00; H04L 1/00

See application file for complete search history.

(56) References Cited

U.S. PATENT DOCUMENTS

| | | | |
|---|---|---|---|
| 9,499,125 B2 | 11/2016 | Akay et al. | |
| 9,589,458 B2 | 3/2017 | Krupnik | |

(Continued)

FOREIGN PATENT DOCUMENTS

| | | | |
|---|---|---|---|
| JP | 2009-253571 A | 10/2009 | |
| JP | 2012-094972 A | 5/2012 | |

(Continued)

*Primary Examiner* — Anne Marie Antonucci
*Assistant Examiner* — Jared C Bean
(74) *Attorney, Agent, or Firm* — Morgan, Lewis & Bockius LLP

(57) ABSTRACT

A vehicle and a control method thereof may increase a shooting angle of a camera mounted on the vehicle to photograph without limitation of the shooting angle. The method of controlling a vehicle including at least one camera, the control method including: adjusting a direction of a vehicle body to adjust a shooting direction of the at least one camera to a target direction thereof; and controlling the at least one camera to photograph in the adjusted shooting direction.

14 Claims, 15 Drawing Sheets

(56) References Cited

U.S. PATENT DOCUMENTS

| | | | | |
|---|---|---|---|---|
| 2018/0022346 A1* | 1/2018 | Murakami | ........... | B60G 17/015 |
| | | | | 701/37 |
| 2018/0025636 A1* | 1/2018 | Boykin | ............ | G08G 1/096725 |
| | | | | 701/1 |
| 2019/0141276 A1 | 5/2019 | Galluzzi et al. | | |
| 2023/0262326 A1* | 8/2023 | Shi | ....................... | H04N 23/695 |
| | | | | 348/36 |

FOREIGN PATENT DOCUMENTS

| | | | |
|---|---|---|---|
| JP | 2013-143723 A | 7/2013 |
| KR | 10-1999-0003576 A | 1/1999 |
| KR | 20-1999-0004538 U | 2/1999 |
| KR | 10-2006-0088988 A | 8/2006 |
| KR | 10-2012-0053713 A | 5/2012 |
| KR | 10-2012-0134570 A | 12/2012 |
| KR | 10-2013-0007243 A | 1/2013 |
| KR | 10-2014-0007212 A | 1/2014 |
| KR | 10-1654034 B1 | 9/2016 |
| KR | 10-2018-0032468 A | 3/2018 |
| KR | 10-2018-0102080 A | 9/2018 |
| KR | 10-1910087 B1 | 10/2018 |
| KR | 10-2019-0071282 A | 6/2019 |
| KR | 10-2020-0002268 A | 1/2020 |

\* cited by examiner

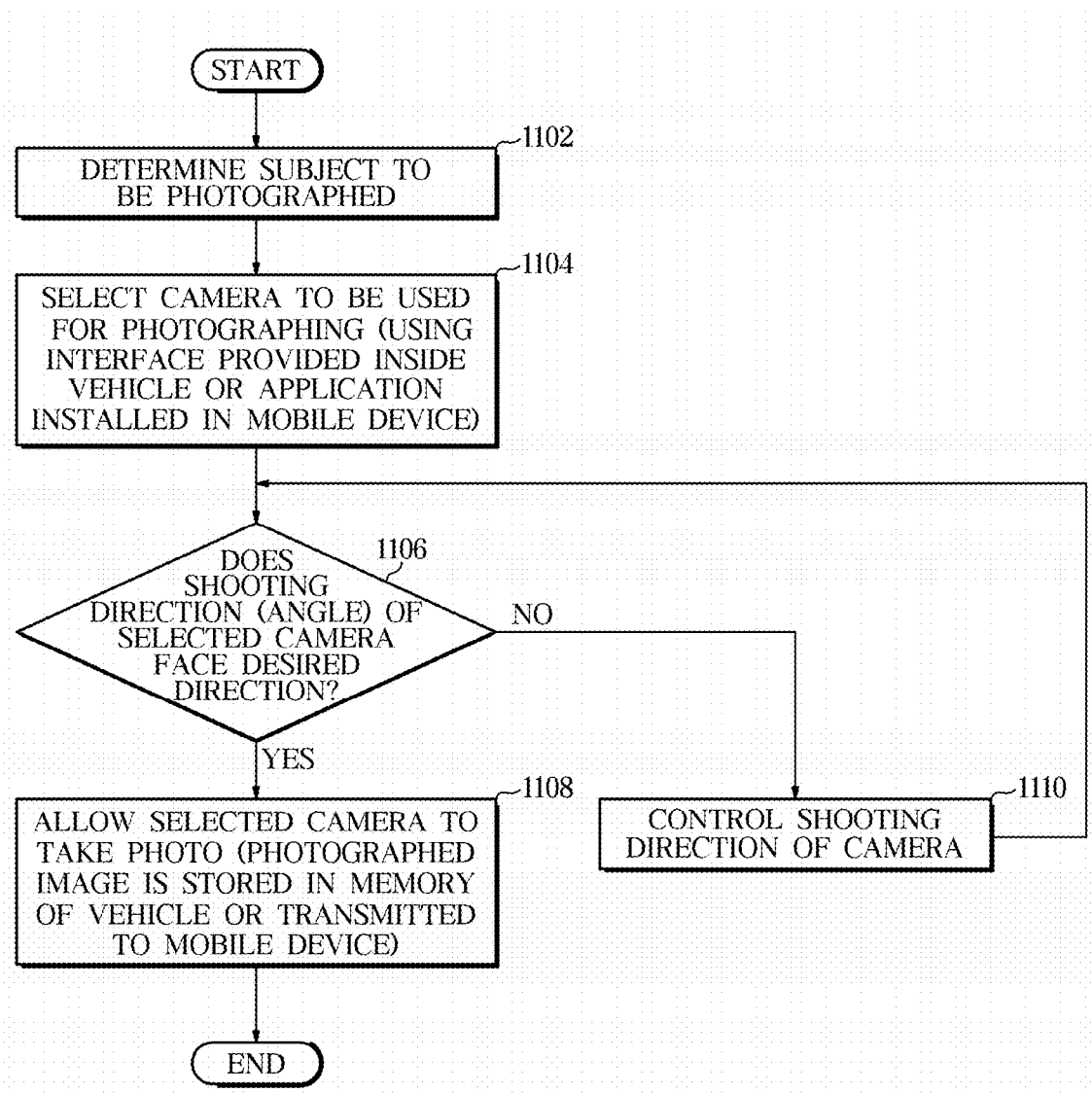

VEHICLE AND CONTROL METHOD THEREOF

CROSS-REFERENCE TO RELATED APPLICATION

The present application claims priority to Korean Patent Application No. 10-2021-0136473, filed on Oct. 14, 2021 the entire contents of which is incorporated herein for all purposes by this reference.

BACKGROUND OF THE PRESENT DISCLOSURE

Field of the Present Disclosure

The present disclosure relates to a vehicle provided with a camera.

Description of Related Art

Vehicles are provided with cameras for various purposes.

A camera called 'black box' is provided inside a vehicle for security and recording.

Also, cameras for photographing an outside of the vehicle may be provided. For example, a front camera, a rear camera, a right side camera, and a left side camera may be provided to photograph the front, rear, right and left sides of the vehicle, respectively.

Because such cameras for vehicle are provided to be fixed, their shooting angles (shooting range) are limited. Furthermore, such cameras for vehicle are simply used for recording, obstacle detection, route determination, etc.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a control method thereof which may increase a shooting angle (shootable range) of a camera mounted on the vehicle, photographing without limitation of the shooting angle.

Also, the vehicle and the control method thereof may photograph surroundings of the vehicle while driving and transmit the photographed image to where the photographed image is required.

Additional aspects of the present disclosure will be set forth in part in the description which follows, and in part, will be obvious from the description, or may be learned by practice of the present disclosure.

According to an exemplary embodiment of the present disclosure, there is provided a method of controlling a vehicle including at least one camera, the control method including: adjusting a shooting direction of the at least one camera to a target direction through adjustment of the at least one camera; when the shooting direction is not adjusted to the target direction through the adjustment of the at least one camera, adjusting a direction of a vehicle body through independent adjustment of at least one of a rotation direction of each of vehicle wheels, a steering direction and a ground clearance of the vehicle to further adjust the shooting direction of the at least one camera to the target direction; and controlling the at least one camera to photograph in the adjusted shooting direction thereof.

In the control method, a parallel direction adjustment to a ground where the vehicle is located is performed, through the independent adjustment of the rotation direction of each of the vehicle wheels and the steering direction, and a vertical direction adjustment to the ground is performed, through the independent adjustment of the ground clearance at a position of each of the vehicle wheels.

The control method further includes, when the photographing is complete, storing a photographed image in the vehicle, transmitting the photographed image to a mobile device connected to the vehicle, or transmitting the photographed image to a server placed in a predetermined location.

According to another exemplary embodiment of the present disclosure, there is provided a method of controlling a vehicle including at least one camera, the control method including: adjusting a shooting direction of the at least one camera to a target direction through adjustment of the at least one camera; when the shooting direction is not adjusted to the target direction through the adjustment of the at least one camera, adjusting a direction of a vehicle body through independent adjustment of at least one of a rotation direction of each of vehicle wheels, a steering direction and a ground clearance of the vehicle to further adjust the shooting direction of the at least one camera to the target direction; and controlling the at least one camera to photograph in the adjusted shooting direction, wherein the adjustment of the at least one camera is performed through a user interface provided in the vehicle for camera control, and the adjusting of the direction of the vehicle body is performed through another user interface provided in the vehicle for vehicle body control.

In the control method, a parallel direction adjustment to a ground where the vehicle is located is performed, through the independent adjustment of the rotation direction of each of the vehicle wheels and the steering direction, and a vertical direction adjustment to the ground is performed, through the independent adjustment of the ground clearance at a position of each of the vehicle wheels.

The control method further includes, when the photographing is complete, storing a photographed image in the vehicle, transmitting the photographed image to a mobile device connected to the vehicle, or transmitting the photographed image to a server placed in a predetermined location.

According to an exemplary embodiment of the present disclosure, there is provided a vehicle, including: at least one camera; and a controller configured to adjust a shooting direction of the at least one camera to a target direction through adjustment of the at least one camera, and when the shooting direction is not adjusted to the target direction through the adjustment of the at least one camera, adjust a direction of a vehicle body through independent adjustment of at least one of a rotation direction of each of vehicle wheels, a steering direction and a ground clearance of the vehicle to further adjust the shooting direction of the at least one camera to the target direction, and control the at least one camera to photograph in the adjusted shooting direction.

The controller is configured to adjust the vehicle body in a direction parallel to a ground where the vehicle is located, through the independent adjustment of the rotation direction of each of the vehicle wheels and the steering direction; and adjust the vehicle body in a direction vertical to the ground, through the independent adjustment of the ground clearance at a position of each of the vehicle wheels.

When the photographing is complete, the controller is further configured to store a photographed image in the vehicle, transmit the photographed image to a mobile device connected to the vehicle, or transmit the photographed image to a server placed in a predetermined location.

According to another exemplary embodiment of the present disclosure, there is provided a vehicle, including: at least one camera; and a controller configured to adjust a shooting direction of the at least one camera to a target direction through adjustment of the at least one camera, and when the shooting direction is not adjusted to the target direction through the adjustment of the at least one camera, adjust a direction of a vehicle body through independent adjustment of at least one of a rotation direction of each of vehicle wheels, a steering direction and a ground clearance of the vehicle to further adjust the shooting direction of the at least one camera to the target direction, and control the at least one camera to photograph in the adjusted shooting direction, wherein the adjustment of the at least one camera is performed in response to an operation of a user interface provided in the vehicle for camera control, and the adjustment of the direction of the vehicle body is performed in response to an operation of another user interface provided in the vehicle for vehicle body control.

In the vehicle, a parallel direction adjustment to a ground where the vehicle is located is performed, through the independent adjustment of the rotation direction of each of the vehicle wheels and the steering direction, and a vertical direction adjustment to the ground is performed, through the independent adjustment of the ground clearance at a position of each of the vehicle wheels.

When the photographing is complete, the controller is further configured to store a photographed image in the vehicle, transmit the photographed image to a mobile device connected to the vehicle, or transmit the photographed image to a server placed in a predetermined location.

According to various exemplary embodiments of the present disclosure, there is provided a method of controlling a vehicle including at least one camera, the control method including: photographing surroundings of the vehicle using the at least one camera; and transmitting a photographed image to a predetermined receiving destination using a wireless communication of the vehicle.

The control method further includes adjusting a shooting direction of the at least one camera before the photographing.

The predetermined receiving destination is at least one of a social networking service; an application for reporting an illegal act; and a fire rescue service.

According to various exemplary embodiments of the present disclosure, there is provided a vehicle, including: at least one camera; and a controller configured to photograph surroundings of the vehicle using the at least one camera, and transmit a photographed image to a predetermined receiving destination using a wireless communication of the vehicle.

The controller is configured to adjust a shooting direction of the at least one camera before the photographing.

The predetermined receiving destination is at least one of a social networking service; an application for reporting an illegal act; and a fire rescue service.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 11 is a flowchart illustrating a method of taking a photo (video) in the driving state illustrated in FIG. 10;

Figure 1:
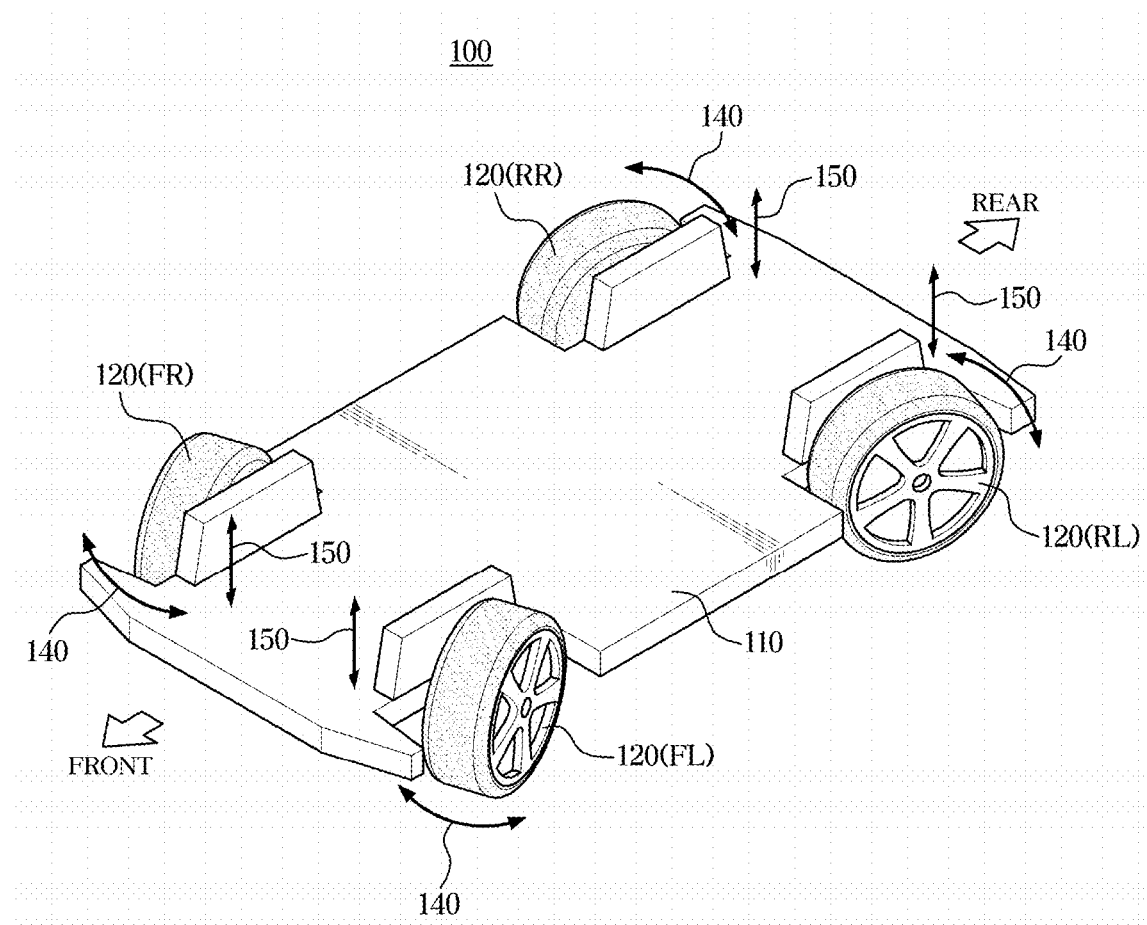
FIG. 1 is a diagram illustrating a frame structure of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

FIG. 1 is a diagram illustrating a frame structure of a vehicle according to an exemplary embodiment of the present disclosure.

According to an exemplary embodiment of the present disclosure, exemplary embodiment of the present disclosure, a vehicle 100 of FIG. 1 is configured for four-wheel independent rotation, four-wheel independent steering, and four-wheel independent ground clearance adjustment.

As shown in FIG. 1, a frame 110 of the vehicle 100 is mechanically connected to four wheels 120. The four wheels 120 may include a front left wheel FL, a front right wheel FR, a rear left wheel RL, and a rear right wheel RR. A front side and a rear side of the vehicle 100 are expressed as 'FRONT' and 'REAR', respectively.

In FIG. 1, each of the four wheels 120 may be independently steered. Each arrow 140 indicates an independent steering angle (direction) of each of the four wheels 120. A steering direction of each of the front left wheel 120FL, the front right wheel 120FR, the rear left wheel 120RL, and the rear right wheel 120RR of the vehicle 100 according to various exemplary embodiments of the present disclosure may be independently adjusted according in a direction (angle) of each of the arrows 140 through independent steering control.

Also, in FIG. 1, each arrow 150 indicates an adjustment direction of ground clearance of the frame 110 connected to the four wheels 120. A ground clearance of each of the front left, front right, rear left, and rear right sides of the vehicle 100 (or the frame 110) according to various exemplary embodiments of the present disclosure may be independently adjusted according in a direction of each of the arrows 150 through independent ground clearance control.

Figure 2C:
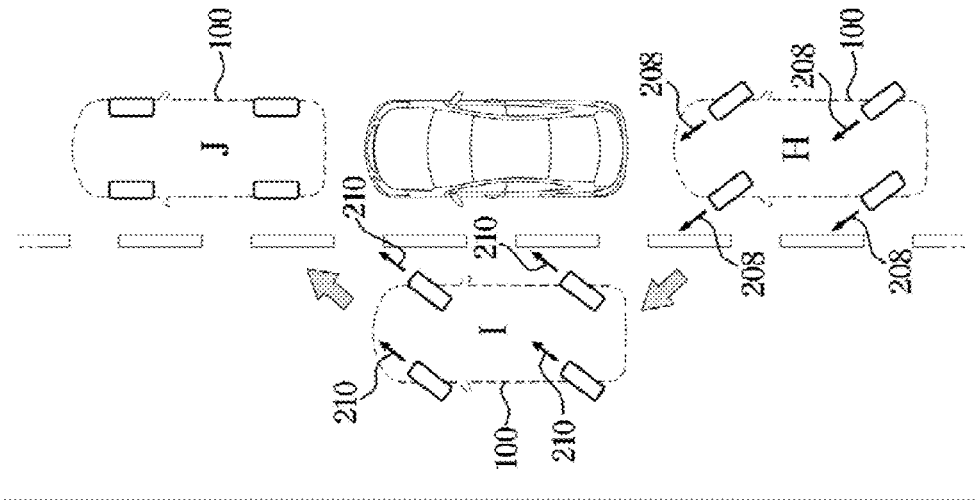
FIG. 2A, FIG. 2B and FIG. 2C are diagrams illustrating various maneuvering modes of a vehicle according to an exemplary embodiment of the present disclosure.
Figure 2B:
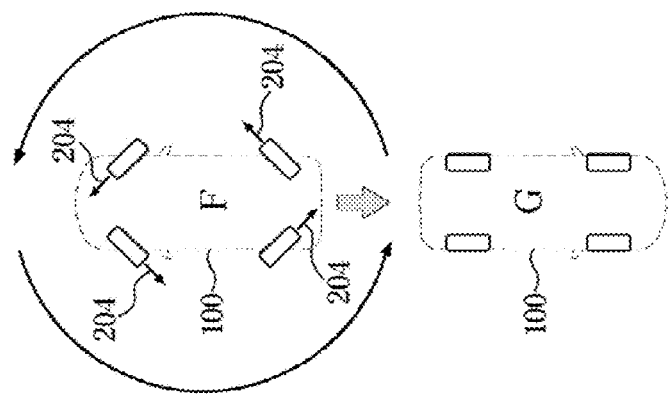
Figure 2A:
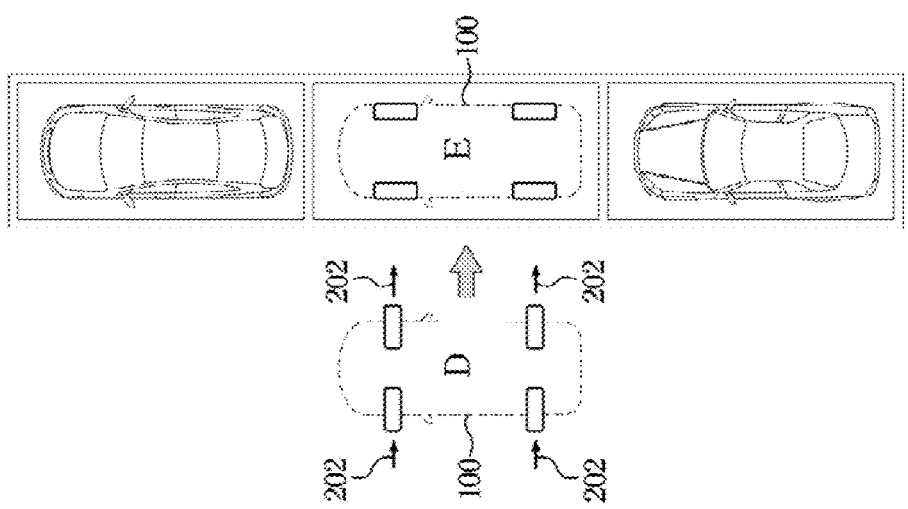

FIG. 2A and FIG. 2B are diagrams illustrating various maneuvering modes of a vehicle according to an exemplary embodiment of the present disclosure. Various maneuvers of the vehicle 100 shown in FIG. 2 may be implemented through four-wheel independent rotation and four-wheel independent steering.

FIG. 2A illustrates a parallel movement of the vehicle 100. As shown in FIG. 2A, the vehicle 100 at a D position steers the four wheels 120 at 90 degrees with respect to a forward and backward direction of the vehicle 100, and then moves in a direction of arrows 202. Accordingly, the vehicle 100 may move easily and rapidly from the D position to an E position shown in FIG. 2A.

FIG. 2B illustrates a 180 degrees rotation of the vehicle 100. As shown in FIG. 2B, the vehicle 100 at a F position steers each of the four wheels 120 at approximately 45 degrees with respect to the forward and backward direction of the vehicle 100, and then moves in a direction of arrows 204 and rotates 180 degrees at the same place. Accordingly, the vehicle 100 may move (change directions) from the F position (direction) to a G position (direction) shown in FIG. 2B. It may be seen in FIG. 2B that a FRONT direction of the vehicle 100 at the F position and a FRONT direction of the vehicle 100 at the G position are changed by 180 degrees.

FIG. 2C illustrates passing of the vehicle 100. As shown in FIG. 2C, the vehicle 100 moves from a H position to a J position through an I position to pass another vehicle 250 located in front of the vehicle 100. First, to move from the H position to the I position, the vehicle 100 steers the four wheels 120 at approximately 45 degrees to the left side of the vehicle 100 with respect to the forward and backward direction of the vehicle 100, and then moves in a direction of arrows 208. Afterwards, to move from the I position to the J position, the vehicle 100 steers the four wheels 120 at approximately 45 degrees to the right side of the vehicle 100 with respect to the forward and backward direction of the vehicle 100, and then moves in a direction of arrows 210. Through the above-described maneuvers, the vehicle 100 may pass the other vehicle 250 in front.

As described above, the vehicle 100 according to various exemplary embodiments of the present disclosure may move in various ways on a two-dimensional plane (e.g., the ground surface) through four-wheel independent rotation and four-wheel independent steering.

FIG. 3A, FIG. 3B, FIG. 3C and FIG. 3D are diagrams illustrating other maneuvering modes of a vehicle according to an exemplary embodiment of the present disclosure. Maneuvers of the vehicle 100 shown in FIG. 3 may be implemented through four-wheel independent ground clearance adjustment.

Figure 3A:
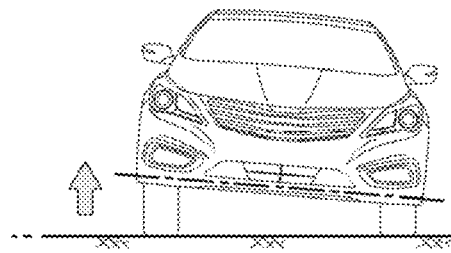
FIG. 3A, FIG. 3B, FIG. 3C and FIG. 3D are diagrams illustrating other maneuvering modes of a vehicle according to an exemplary embodiment of the present disclosure.

FIG. 3A illustrates a state in which a ground clearance of a right wheel side of the vehicle 100 is increased. Through the above, while right wheels of the vehicle 100 are still in contact with the ground, a right side of the vehicle 100 becomes higher than a left side of the vehicle 100.

Figure 3B:
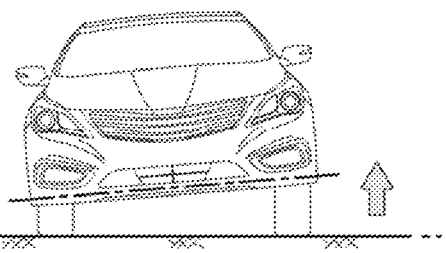

FIG. 3B illustrates a state in which a ground clearance of a left wheel side of the vehicle 100 is increased. Through the above, while left wheels of the vehicle 100 are still in contact with the ground, the left side of the vehicle 100 becomes higher than the right side of the vehicle 100.

Figure 3C:
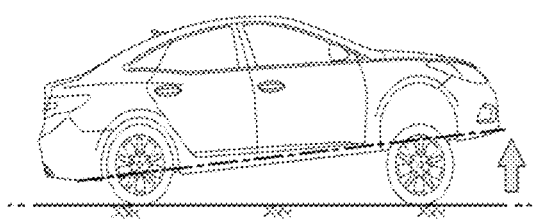

FIG. 3C illustrates a state in which a ground clearance of a front wheel side of the vehicle 100 is increased. Through the above, while front wheels of the vehicle 100 are still in contact with the ground, a front side of the vehicle 100 becomes higher than a rear side of the vehicle 100.

Figure 3D:
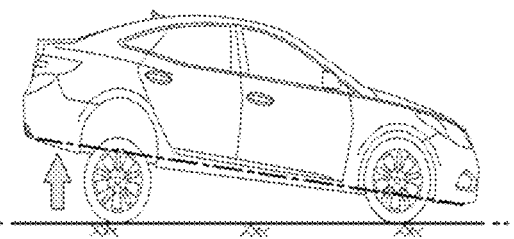

FIG. 3D illustrates a state in which a ground clearance of a rear wheel side of the vehicle 100 is increased. Through the above, while rear wheels of the vehicle 100 are still in contact with the ground, the rear side of the vehicle 100 becomes higher than the front side of the vehicle 100.

Although the ground clearance adjustment of each of the left, right, front, and rear wheels is referred to as examples, the ground clearance adjustment of one of the front left wheel 120FL and the front right wheel 120FR, or the ground clearance adjustment of one of the rear left wheel 120RL and the rear right wheel 120RR may be independently performed.

As described above, the vehicle 100 according to various exemplary embodiments of the present disclosure may move in various ways in vertical direction on the ground through four-wheel independent ground clearance adjustment.

Figure 4:
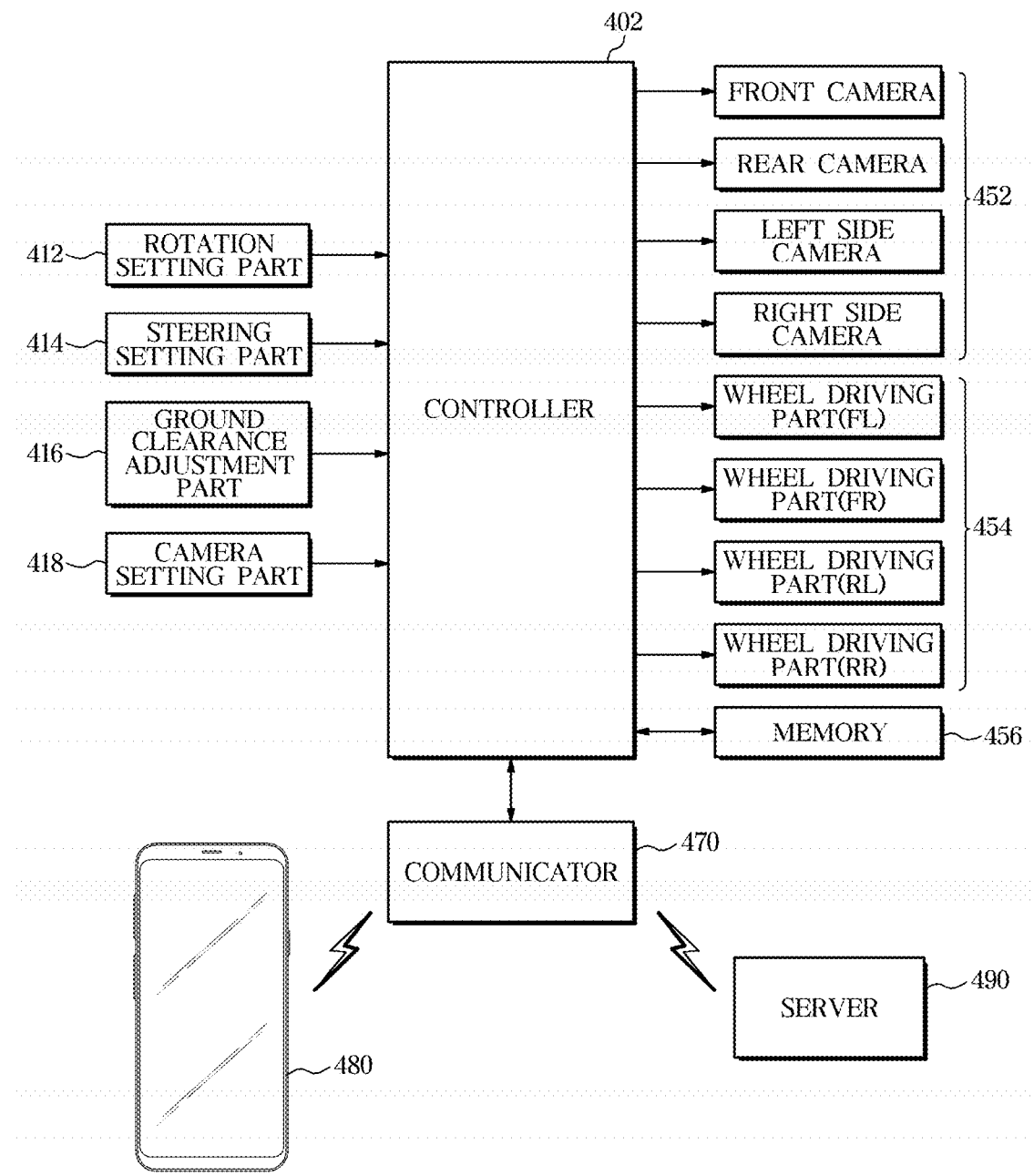
FIG. 4 is a control block diagram illustrating a control system of a vehicle according to an exemplary embodiment of the present disclosure.

FIG. 4 is a control block diagram illustrating a control system of a vehicle according to an exemplary embodiment of the present disclosure.

As shown in FIG. 4, a rotation setting portion 412, a steering setting portion 414, a ground clearance adjustment portion 416, and a camera setting portion 418, which are an input side of a controller 402, are electrically and communicatively connected to the controller 402.

The rotation setting portion 412 is provided so that a user (driver) may set a rotation direction of each of the four wheels 120. The steering setting portion 414 is provided so that the user may set a steering direction of each of the four wheels 120. The ground clearance adjustment portion 416 is provided so that the user may set a ground clearance of the vehicle 100 at each position of the four wheels 120. The camera setting portion 418 is provided so that the user may control a shooting direction, a start and end of shooting, etc., of each of cameras 452 provided in the vehicle 100.

The plurality of cameras 452 and a plurality of wheel driving portions 454, which are an output side of a controller 402, are electrically and communicatively connected to the controller 402.

The plurality of cameras 452 may include a front camera, a rear camera, a left side camera, and a right side camera of the vehicle 100. The shooting direction, the start and end of shooting, etc., of each of the cameras 452 may be controlled in response to a manipulation of the camera setting portion 418 described above.

The plurality of wheel driving portions 454 allow independent driving of each of the four wheels 120 mounted on the vehicle 100. The plurality of wheel driving portions 454 drive the four wheels 120 in response to the manipulation amount of the rotation setting portion 412, the steering setting portion 414, and the ground clearance adjustment portion 416. The driving of the four wheels 120 by the wheel driving portions 454 includes independent rotation, steering, and ground clearance adjustment of each of the four wheels 120.

Also, a communicator 470 is connected to the controller 402. The communicator 470 enables the controller 402 to wirelessly communicate with a mobile device 480 of a user or a server 490 located remotely.

An application (also referred to as an app) that allows the user to remotely control the vehicle 100 is provided in the mobile device 480 of the user. The user may use the application provided in the mobile device 480 like the above-described rotation setting portion 412, the steering setting portion 414, the ground clearance adjustment portion 416, and the camera setting portion 418. That is, the user may adjust a rotation direction, a steering angle, and ground clearance of each of the four wheels 120 through the application of the mobile device 480. Also, the user may control the shooting direction, the start and end of shooting, etc., of each of the cameras 452 through the application of the mobile device 480.

The server 490 may be a server related to an insurance, traffic accident report, or illegal act report. An image photographed by the plurality of cameras 452 of the vehicle 100 may be transmitted to the server 490 through the communicator 470 under control of the controller 402.

Figure 5:
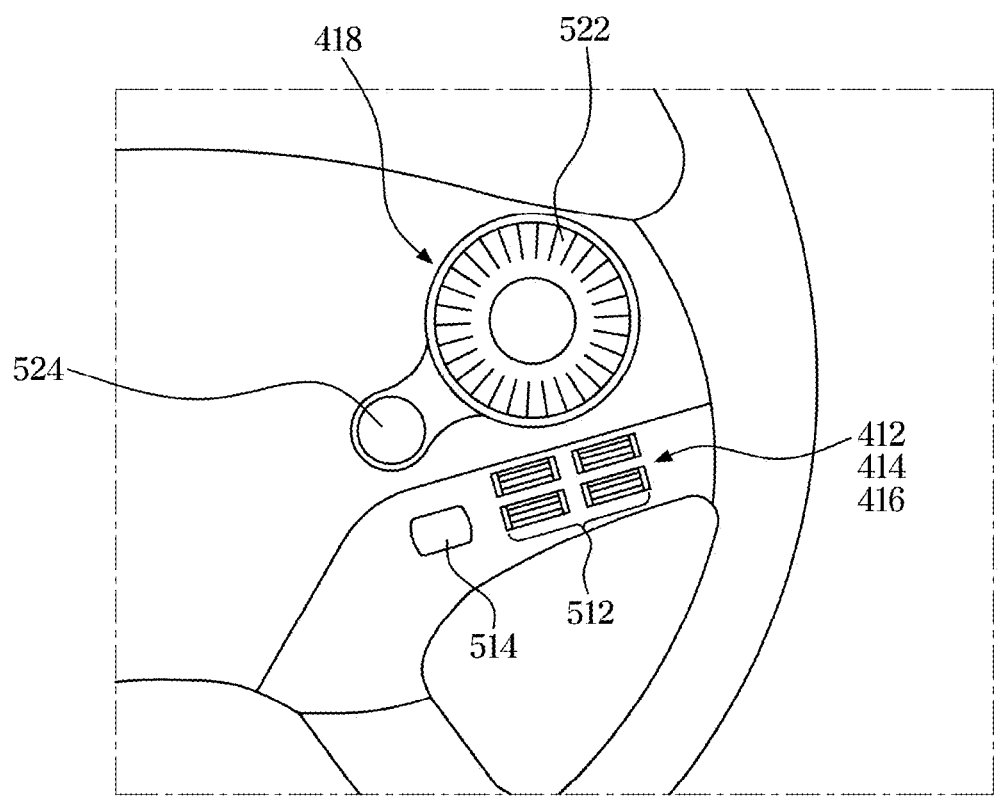
FIG. 5 is a diagram illustrating a setting portion of a vehicle according to an exemplary embodiment of the present disclosure.

FIG. 5 is a diagram illustrating a setting portion of a vehicle according to an exemplary embodiment of the present disclosure. The rotation setting portion 412, the steering setting portion 414, the ground clearance adjustment portion 416, and the camera setting portion 418 are illustrated in FIG. 5.

The rotation setting portion 412, the steering setting portion 414 and the ground clearance adjustment portion 416 may be configured as a single interface 512 and 514. A dial 512 is for adjusting a rotation direction, a steering angle and a ground clearance of each of the four wheels 120. A mode selection button 514 is for facilitating a user to select one of a rotation setting mode, a steering setting mode, and a ground clearance setting mode. The user may select one of the rotation setting mode, the steering setting mode, and the ground clearance setting mode through manipulation of the mode selection button 514, and adjust one of the rotation direction, the steering angle and the ground clearance of each of the four wheels 120 through manipulation of the dial 512.

The camera setting portion 418 may include a camera selection/adjustment dial 522 and a shooting button 524. The user may select one of the plurality of cameras 452 and adjust a shooting angle (direction) of the selected camera through the camera selection/adjustment dial 522. Also, the user may manipulate the shooting button 524 in a state where the camera is selected, facilitating the selected camera to take a photograph (video).

Figure 6A:
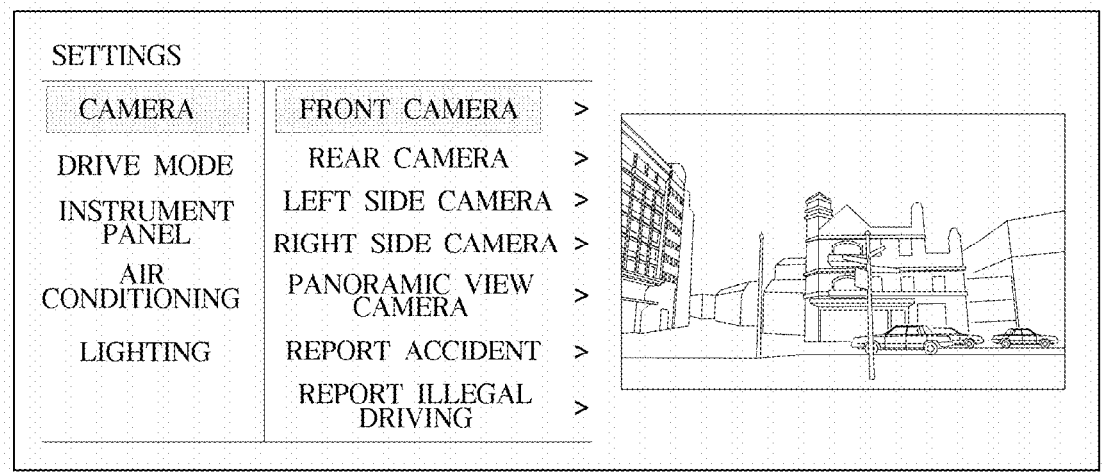
FIGS. 6A and 6B are diagrams illustrating a user interface for controlling a camera of a vehicle according to an exemplary embodiment of the present disclosure.
Figure 6B:
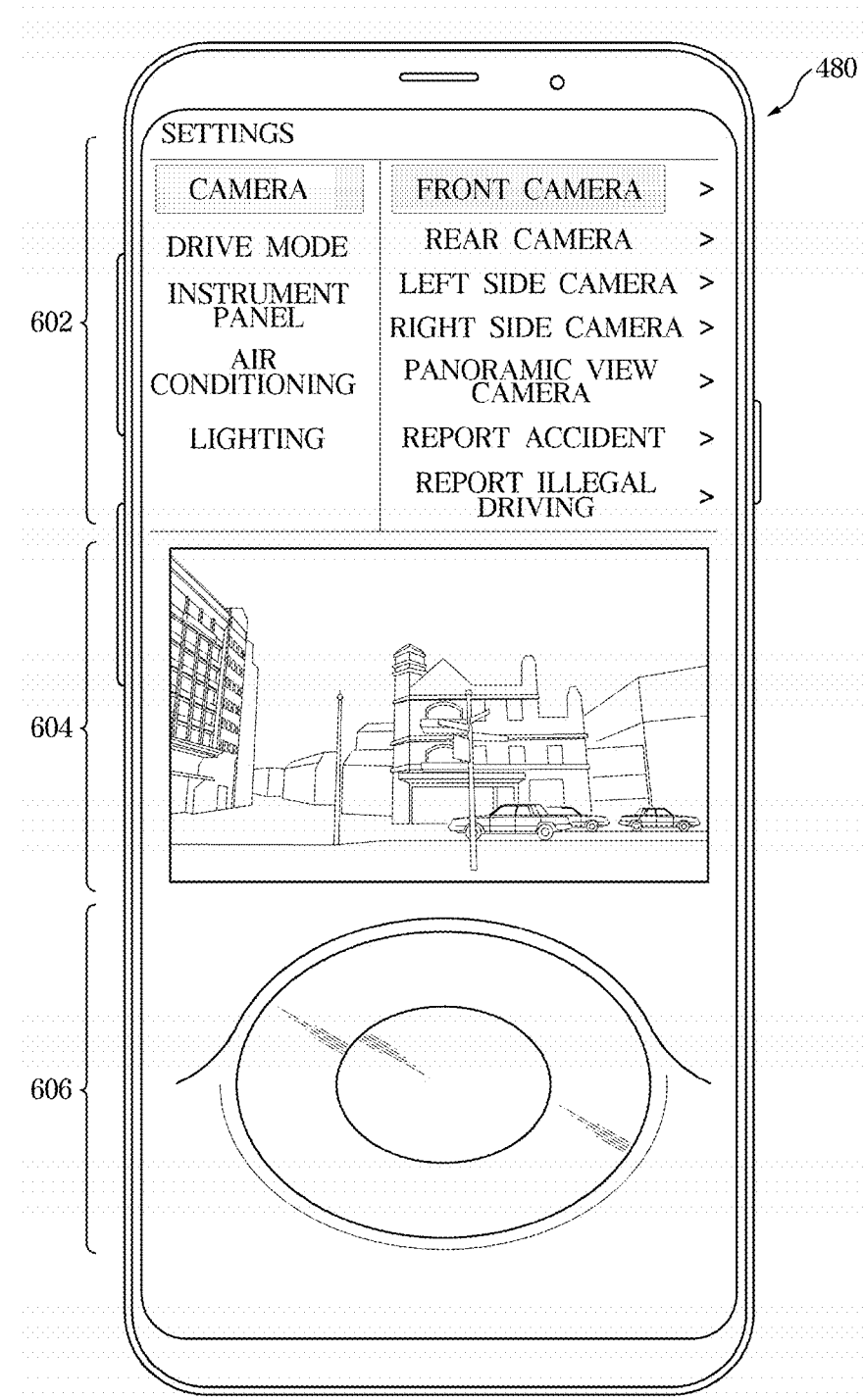

FIGS. 6A and 6B are diagrams illustrating a user interface for controlling a camera of a vehicle according to an exemplary embodiment of the present disclosure.

As shown in FIG. 6A, when pressing the shooting button 524 described above, a camera-related menu is displayed on a display 602 (e.g., a display of a multimedia device or navigation) provided in the vehicle 100. A user may select a front camera, rear camera, left side camera, or right side camera from the camera-related menu shown in FIG. 6A. The user may select a portion of or all of the four cameras 452 for a panorama photo. Also, the user may select a 'report accident' or 'report illegal driving' from the camera-related menu shown in FIG. 6A. A selection from the camera-related menu shown in FIG. 6A may be made through manipulation of the camera selection/adjustment dial 522 shown in FIG. 5. As shown in FIG. 6A, an image photographed by the selected camera may be displayed next to the camera-related menu.

According to an exemplary embodiment of the present disclosure, exemplary embodiment of the present disclosure, the user interface for camera control of the vehicle 100 may also be displayed on the mobile device 480 of the user paired with the vehicle 100. FIG. 6B illustrates an execution screen of an application for controlling the plurality of cameras 452. As shown in FIG. 6B, the execution screen of the application for controlling the plurality of cameras 452 includes a menu area 602, an image display area 604 and a jog dial area 606. The camera-related menu shown in FIG. 6A is displayed in the menu area 602. An image of a subject input in the currently selected camera is displayed in the image display area 604. The jog dial area 606 is for adjusting a shooting angle (direction) of the selected camera.

Figure 7:
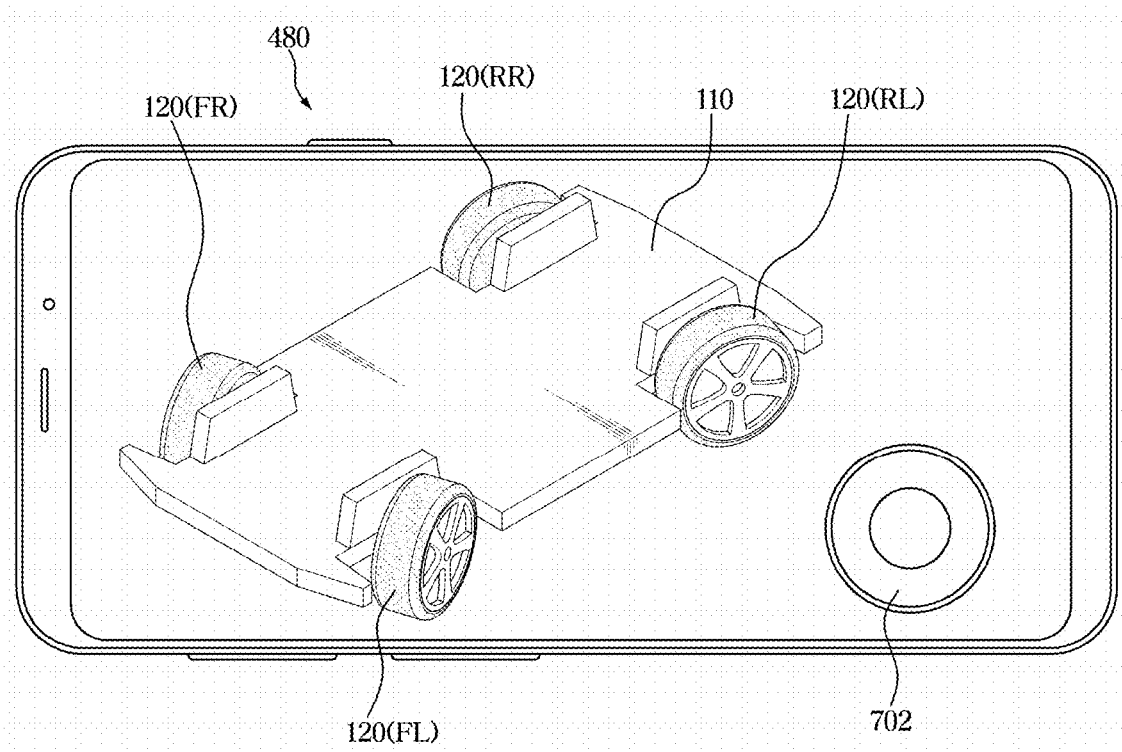
FIG. 7 is a diagram illustrating a user interface for controlling a vehicle according to an exemplary embodiment of the present disclosure.

FIG. 7 is a diagram illustrating a user interface for controlling a vehicle according to an exemplary embodiment of the present disclosure. FIG. 7 illustrates a vehicle control user interface displayed on a display of the mobile device 480. A user may control an independent rotation direction, steering angle, and ground clearance adjustment of each of the four wheels 120 of the vehicle 100 through an application provided in the mobile device 480.

As shown in FIG. 7, the frame 110 and the four wheels 120 of the vehicle 100 are displayed on the user interface implemented through execution of the application in the mobile device 480. Furthermore, a jog dial 702 for controlling an independent rotation direction, steering angle, and ground clearance adjustment of each of the four wheels 120 of the vehicle 100 is displayed. The user may select one of the four wheels 120 whose setting value is to be changed with touch of a display surface, and set the rotation direction, steering angle, and ground clearance of the selected wheel 120 through manipulation of the jog dial 702.

Figure 8A:
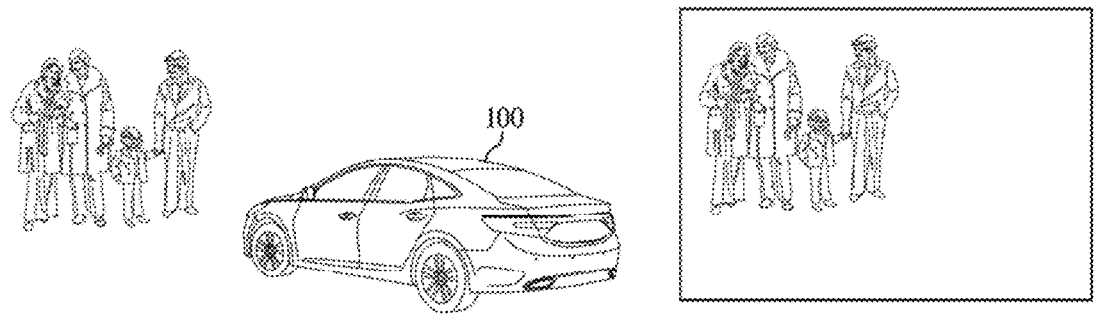
FIG. 8A, FIG. 8B and FIG. 8C are diagrams illustrating an example of taking a photo (video) in a stationary state of a vehicle according to an exemplary embodiment of the present disclosure.
Figure 8B:
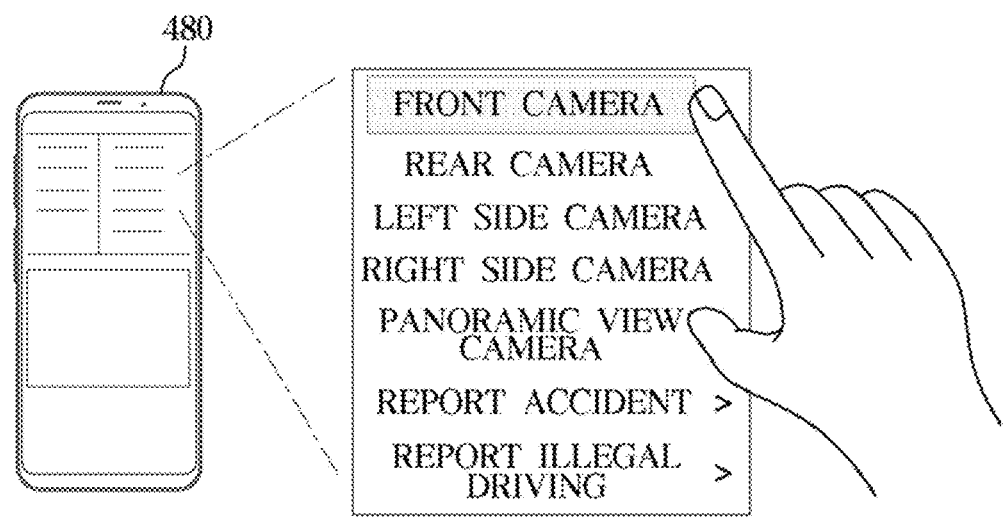

FIG. 8A and FIG. 8B are diagrams illustrating an example of taking a photo (video) in a stationary state of a vehicle according to an exemplary embodiment of the present disclosure. In the photographing shown in FIG. 8, a shooting direction of the camera 452 is controlled using four-wheel independent rotation, four-wheel independent steering, and four-wheel independent ground clearance adjustment of each of the four wheels 120 of the vehicle 100.

A subject outside the vehicle 100 may be photographed by use of the camera 452 of the vehicle 100. In the present instance, the shooting direction (angle) of the camera 452 may be adjusted so that the subject to be photographed is located at a desired position (e.g., center) in an image.

As shown in FIG. 8A, however, the shooting direction of the camera 452 may not be accurately adjusted in a desired direction due to a limited adjustment range of the shooting direction of the camera 452. In FIG. 8A, although the shooting direction of the camera 452 is adjusted toward the subject as far as possible, the subject is still not located in the center portion of the image.

In the instant case, as shown in FIG. 8B, a user may select the camera 452 to be used for photographing from the plurality of cameras 452 of the vehicle 100, and further control the shooting direction of the camera 452 using the four-wheel independent rotation, four-wheel independent steering, and four-wheel independent ground clearance adjustment of each of the four wheels 120 of the vehicle 100 described with reference to FIGS. 1 to 7.

Figure 8C:
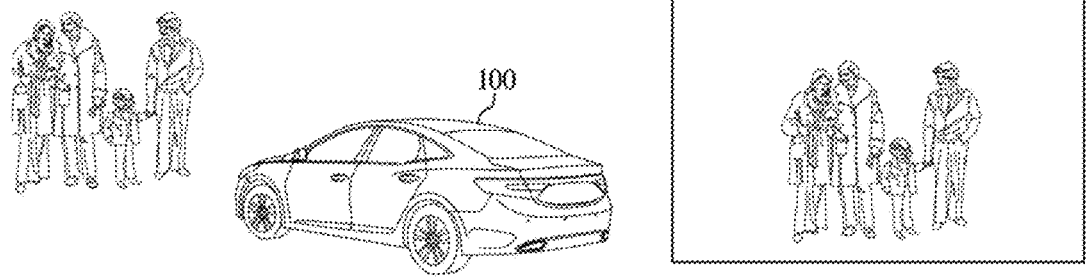

That is, by further adjusting the shooting direction of the camera 452 using the four-wheel independent rotation, four-wheel independent steering, and four-wheel independent ground clearance adjustment of each of the four wheels 120 in addition to the adjustment of shooting direction of each of the cameras 452, the subject to be photographed may be located at the desired position (e.g., center) in the image, as shown in FIG. 8C.

Figure 9:
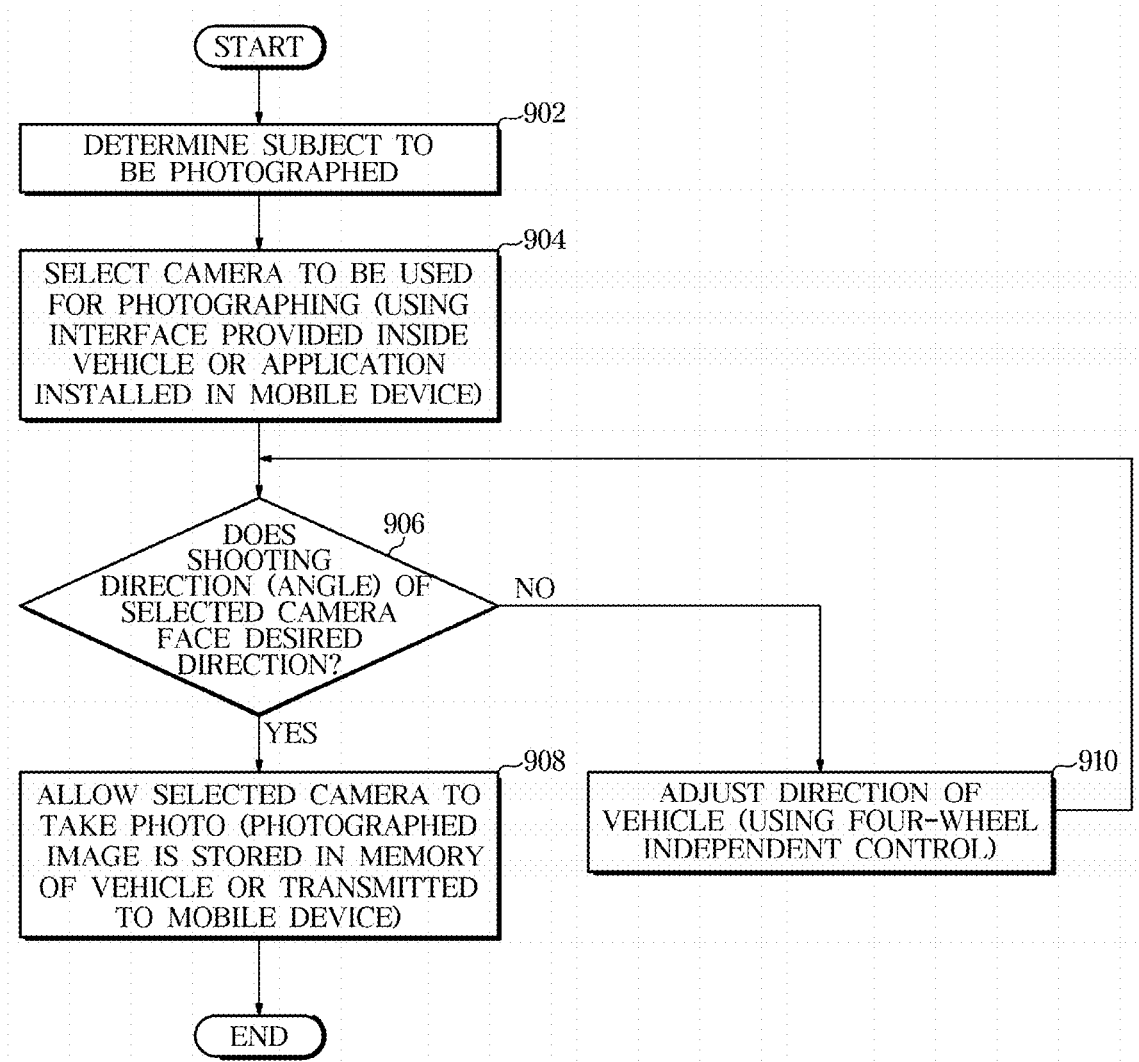
FIG. 9 is a flowchart illustrating a method of taking a photo (video) in the stationary state illustrated in FIG. 8.

FIG. 9 is a flowchart illustrating a method of taking a photo (video) in the stationary state illustrated in FIG. 8.

As shown in FIG. 9, first, a user determines a subject to be photographed (902).

When the subject to be photographed is determined, the user selects a camera to be used for photographing from the plurality of cameras 452 provided in the vehicle 100 (904). In the present instance, the user may use an interface provided inside the vehicle 100 (refer to FIG. 5) or an application provided in the mobile device 480 of the user (refer to FIG. 6B).

The user checks whether a shooting direction of the selected camera 452 faces a desired direction (906). In the present instance, the shooting direction (angle) of the selected camera 452 in the instant state is a shooting direction (angle) after the selected camera 452 itself adjusts the shooting direction.

When the shooting direction (angle) of the selected camera 452 faces the desired direction (Yes in operation 906), the user may allow the selected camera 452 to take a photograph (908). To the present end, the user may use the interface provided inside the vehicle 100 (refer to FIG. 5) or the application provided in the mobile device 480 of the user (refer to FIG. 6B).

By contrast, when the shooting direction (angle) of the selected camera 452 does not face the desired direction (No in operation 906), the user may allow the shooting direction (angle) of the selected camera 452 to face the desired subject through direction control of the vehicle 100 (refer to FIG. 7). That is, when the shooting direction (angle) of the selected camera 452 does not face the desired subject through direction adjustment of the selected camera 452 itself, a direction of the vehicle 100 itself may be adjusted through four-wheel independent rotation, four-wheel independent steering, and four-wheel independent ground clearance adjustment of each of the four wheels 120 of the vehicle 100 (910), so that the shooting direction (angle) of the selected camera 452 may face the desired subject.

When the direction control of the vehicle 100 is complete, the user checks whether the shooting direction (angle) of the selected camera 452 faces the desired direction again (906). When the shooting direction (angle) of the selected camera 452 faces the desired direction (Yes in operation 906), the user may allow the selected camera 452 to take a photograph (908). To the present end, the user may use the interface provided inside the vehicle 100 (refer to FIG. 5) or the application provided in the mobile device 480 of the user (refer to FIG. 6B).

When the photographing is complete (908), the photographed image may be stored in a memory 456 provided in the vehicle 100 or transmitted to the mobile device 480.

Figure 10A:
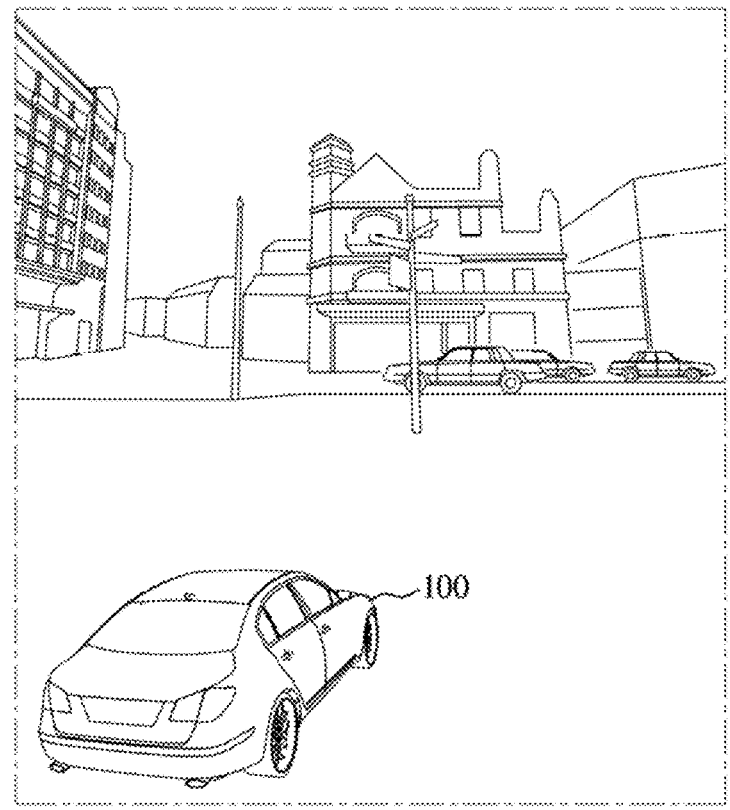
FIG. 10A and FIG. 10B are diagrams illustrating an example of taking a photo (video) in a driving state of a vehicle according to an exemplary embodiment of the present disclosure.
Figure 10B:
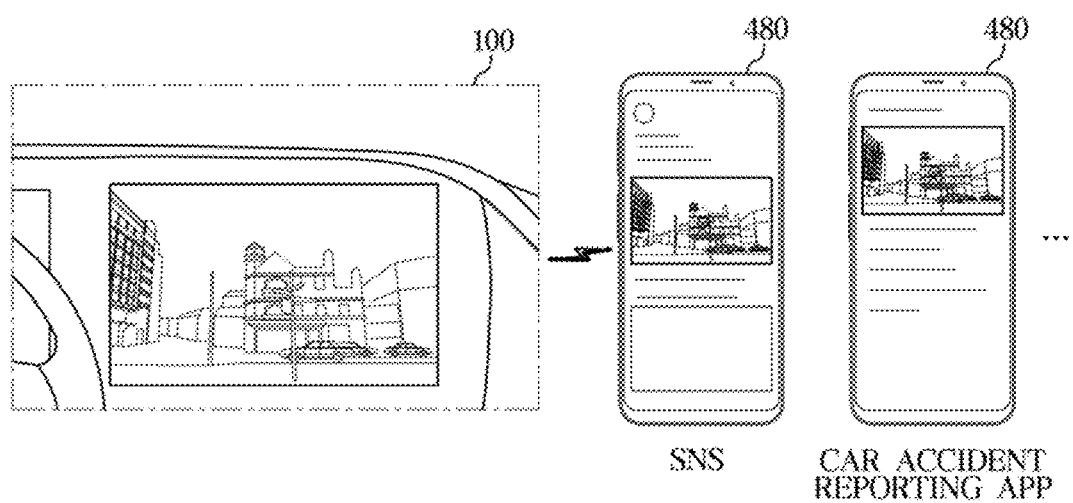

FIG. 10A and FIG. 10B are diagrams illustrating an example of taking a photo (video) in a driving state of a vehicle according to an exemplary embodiment of the present disclosure. In the photographing of FIG. 10, an image photographed while driving is uploaded to a social networking service (SNS) or a reporting application for reporting traffic violations.

As shown in FIG. 10A, when a user (an occupant) of the vehicle 100 desires to photograph surroundings of the vehicle 100 while driving, the user may select at least one from the plurality of cameras 452 of the vehicle 100, and photograph a desired subject using the selected camera 452. Alternatively, one of the plurality of cameras 452 may be set as a default in advance, and when the user issues a photographing command, the camera 452 preset as a default may photograph the subject.

As shown in FIG. 10B, the photographed image may be displayed on a display provided inside the vehicle 1000. Also, as shown in FIG. 10B, the photographed image may be uploaded to a social network services (SNS) or a reporting application for reporting traffic violations, or transmitted to a fire rescue service (e.g., 911) through a wireless communication network of the mobile device 480 connected to the vehicle 100.

As described above, the user (occupant) of the vehicle 100 while driving may easily allow the surroundings of the vehicle 100 to be photographed and allow the photographed image to be automatically transmitted to where the photographed image is required, through a wireless communication network. For example, when a driver of the vehicle 100 while driving sees a vehicle accident scene, disaster scene, crime scene, etc., around the vehicle 100, the driver may easily photograph such a scene for securing evidence or reporting. The photographed image may be automatically uploaded to and stored in the SNS through a wireless communication network. Alternatively, the photographed image may be uploaded to the reporting application for reporting traffic violations, to make a report. Alternatively, the photographed image may be transmitted to the fire rescue service (e.g., 911) to dispatch an ambulance.

FIG. 11 is a flowchart illustrating a method of taking a photo (video) in the driving state illustrated in FIG. 10.

As shown in FIG. 11, first, a user determines a subject to be photographed (1102).

When the subject to be photographed is determined, the user selects a camera to be used for photographing from the plurality of cameras 452 provided in the vehicle 100 (1104). In the present instance, the user may use an interface provided inside the vehicle 100 (refer to FIG. 5) or an application provided in the mobile device 480 of the user (refer to FIG. 6B). Alternatively, one of the plurality of cameras 452 may be set as a default in advance, and when the user issues a photographing command, the camera 452 preset as a default may photograph the subject.

The user checks whether a shooting direction of the selected camera 452 faces a desired direction (1106). In the present instance, the shooting direction (angle) of the selected camera 452 in the instant state is a shooting direction (angle) when the shooting direction the selected camera 452 is not adjusted.

When the shooting direction (angle) of the selected camera 452 faces the desired direction (Yes in operation 1106), the user may allow the selected camera 452 to take a photograph (1108). To the present end, the user may use the interface provided inside the vehicle 100 (refer to FIG. 5) or the application provided in the mobile device 480 of the user (refer to FIG. 6B).

By contrast, when the shooting direction (angle) of the selected camera 452 does not face the desired direction (No in operation 1106), the user may allow the shooting direction (angle) of the selected camera 452 to face the desired subject through direction adjustment of the selected camera 452 (1110). That is, the shooting direction (angle) of the selected camera 452 may be controlled to face the desired subject through the direction control of the selected camera 452 itself.

When the direction control of the selected camera 452 is complete, the user checks whether the shooting direction (angle) of the selected camera 452 faces the desired direction again (1106). When the shooting direction (angle) of the selected camera 452 faces the desired direction (Yes in operation 1106), the user may allow the selected camera 452 to take a photograph (1108). To the present end, the user may use the interface provided inside the vehicle 100 (refer to FIG. 5) or the application provided in the mobile device 480 of the user (refer to FIG. 6B).

When the photographing is complete (1108), the photographed image may be stored in the memory 456 provided in the vehicle 100 or transmitted to the mobile device 480. The photographed image may be uploaded to an SNS or a reporting application for reporting traffic violations, or transmitted to a fire rescue service (e.g., 911) through a wireless communication network of the mobile device 480.

As described above, the user (occupant) of the vehicle 100 while driving may easily allow the surroundings of the vehicle 100 to be photographed and allow the photographed image to be automatically transmitted to where the photographed image is required, through a wireless communication network. For example, when a driver of the vehicle 100 while driving sees a vehicle accident scene, disaster scene, crime scene, etc., around the vehicle 100, the driver may easily photograph such a scene for securing evidence or reporting. The photographed image may be automatically uploaded to and stored in the SNS through a wireless communication network. Alternatively, the photographed image may be uploaded to the reporting application for reporting traffic violations, to make a report. Alternatively, the photographed image may be transmitted to the fire rescue service (e.g., 911) to dispatch an ambulance.

Figure 12A:
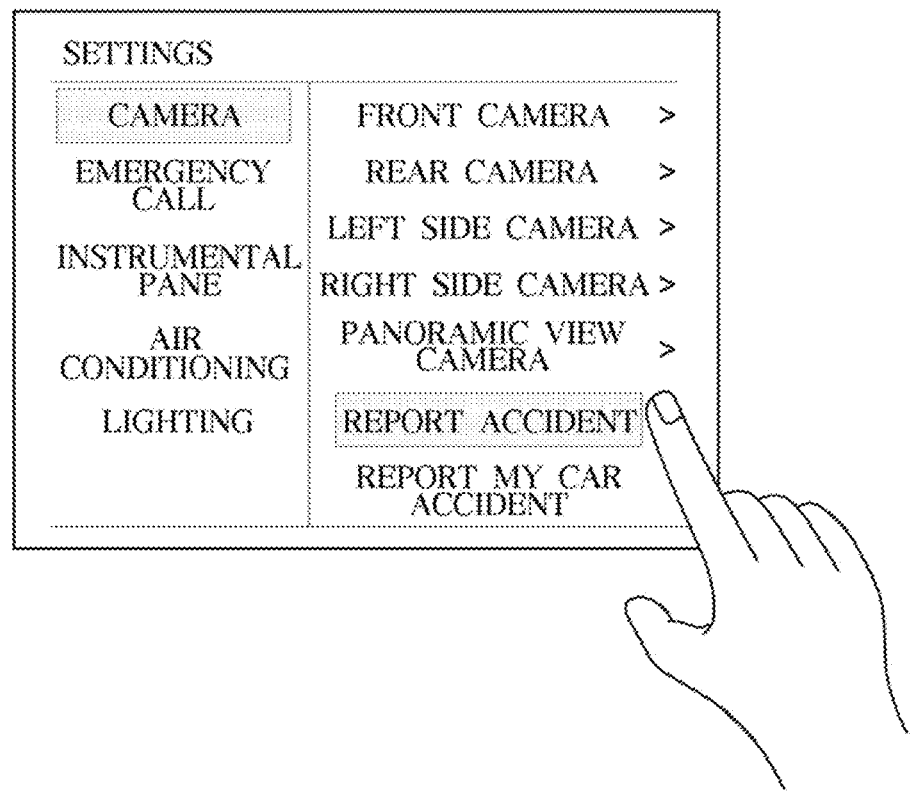
FIG. 12A and FIG. 12B are diagrams illustrating an example of reporting an accident in a vehicle according to an exemplary embodiment of the present disclosure.
Figure 12B:
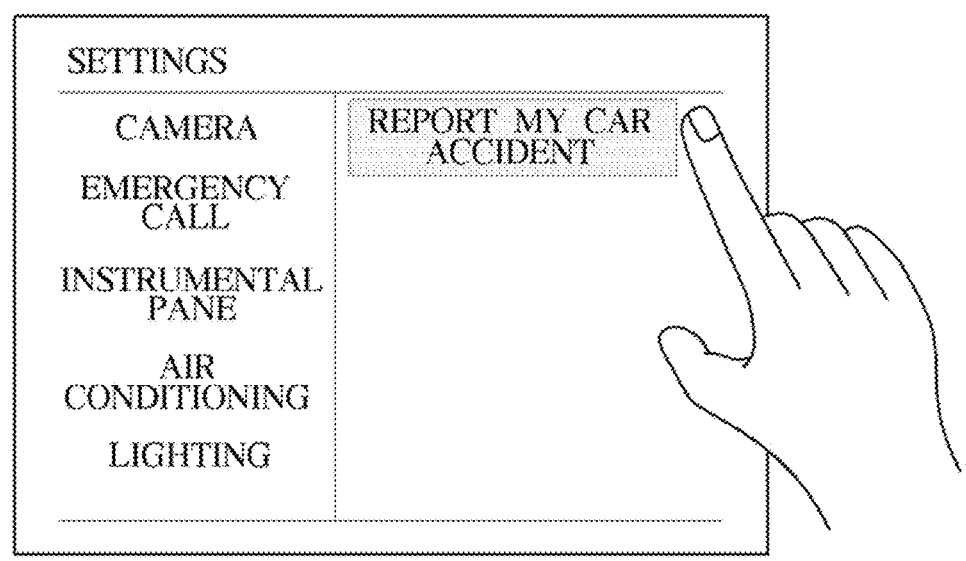

FIG. 12A and FIG. 12B are diagrams illustrating an example of reporting an accident in a vehicle according to an exemplary embodiment of the present disclosure.

According to an exemplary embodiment of the present disclosure, exemplary embodiment of the present disclosure, when a user of the vehicle 100 is involved in an accident while driving or stopping, or witness an accident or traffic violation of another vehicle, the user may photograph a corresponding scene using at least one of the plurality of cameras 452 of the vehicle 100, and allow the photographed image to be transmitted to a vehicle insurer or police, or uploaded to a reporting application for reporting traffic violations.

As described above, the user (occupant) of the vehicle 100 while driving may easily allow the surroundings of the vehicle 100 to be photographed and allow the photographed image to be automatically transmitted to where the photographed image is required, through a wireless communication network. For example, when a driver of the vehicle 100 while driving sees a vehicle accident scene, disaster scene, crime scene, etc., around the vehicle 100, the driver may easily photograph such a scene for securing evidence or reporting. The photographed image may be automatically uploaded to and stored in an SNS through a wireless communication network. Alternatively, the photographed image may be uploaded to the reporting application for reporting traffic violations, to make a report. Alternatively, the photographed image may be transmitted to the fire rescue service (e.g., 911) to dispatch an ambulance.

For instance, as shown in FIG. 12A, when witnessing an accident scene, the user may select a 'report accident' menu which is a sub-menu of a 'camera' menu of the vehicle 100, on a user interface for camera control displayed on a multimedia device of the vehicle 100 or the mobile device 480 of the user. Afterwards, the user may select at least one of the plurality of cameras 452 and photograph the accident scene, and allow the photographed image to be transmitted to a vehicle insurer or police.

Alternatively, as shown in FIG. 12B, when the vehicle 100 is directly involved in a vehicle accident, the user may select a 'report my vehicle accident' menu which is a sub-menu of a 'emergency call' menu of the vehicle 100, on the user interface for camera control displayed on the multimedia device of the vehicle 100 or the mobile device 480 of the user. Afterwards, the user may select at least one of the plurality of cameras 452 and photograph the accident scene, and allow the photographed image to be transmitted to a vehicle insurer or police.

Figure 13:
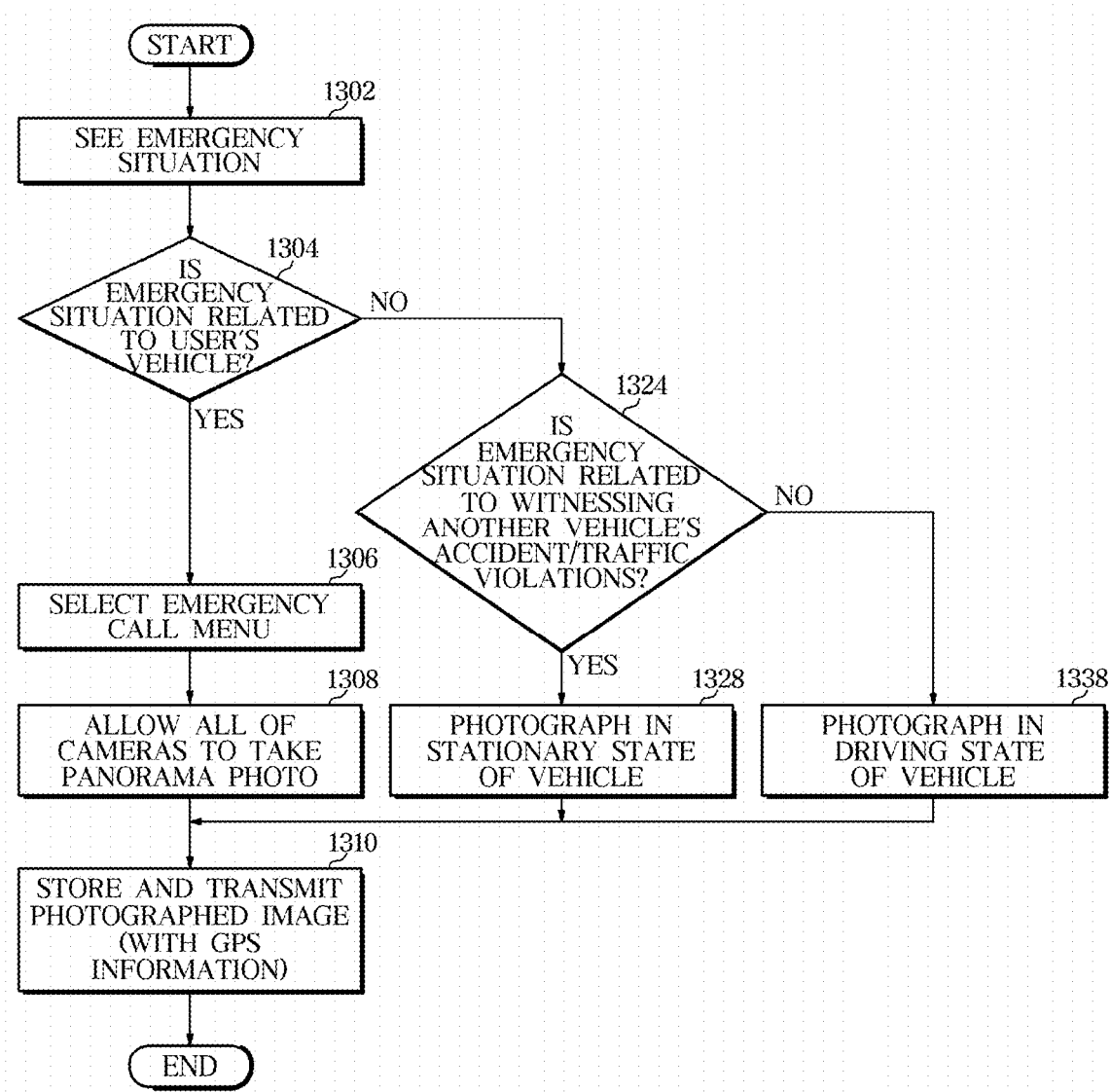
FIG. 13 is a flowchart illustrating a method of reporting an accident in the vehicle illustrated in FIG. 12.

FIG. 13 is a flowchart illustrating a method of reporting an accident in the vehicle illustrated in FIG. 12.

As shown in FIG. 13, while driving the vehicle 100, the user may see an emergency situation (1302).

When the emergency situation is related to the user's vehicle (i.e., the vehicle 100) (Yes in operation 1304), the user may select the 'report my vehicle accident' menu which is the sub-menu of the 'emergency call' menu of the vehicle 100 (1306), as described with reference to FIG. 12B. Afterwards, the user may select a portion of or all of the plurality of cameras 452 to take a panorama photo of the accident site (1308), and allow the photographed image to be transmitted to a vehicle insurer or police after storing the photographed image (1310). When transmitting the photographed image, global positioning system (GPS) coordinate information of the accident site may be transmitted together.

When the emergency situation is not related to the user's vehicle (i.e., the vehicle 100) (No in operation 1304) and is related to witnessing another vehicle's accident/traffic violations (Yes in operation 1324), the user may take a photograph of an accident site in a stationary state of the vehicle 100 (1328), as described with reference to FIG. 8 and FIG. 9. Afterwards, the user may select a portion of or all of the plurality of cameras 452 to take a panorama photo of the accident site (1308). Afterwards, the user may allow the photographed image to be transmitted to a vehicle insurer or police after storing the photographed image (1310). When transmitting the photographed image, Global Positioning System (GPS) coordinate information of the accident site may be transmitted together.

When the emergency situation is related to neither the user's vehicle (i.e., the vehicle 100) (No in operation 1304) nor witnessing the other vehicle's accident/traffic violations (No in operation 1324), that is, when photographing while driving is suitable without having to stop, the user may take a photograph in a driving state of the vehicle 100 (1338), as described with reference to FIG. 10, and FIG. 11. Afterwards, the user may allow the photographed image to be transmitted to a vehicle insurer or police after storing the photographed image (1310). When transmitting the photographed image, GPS coordinate information of the accident site may be transmitted together.

Figure 14A:
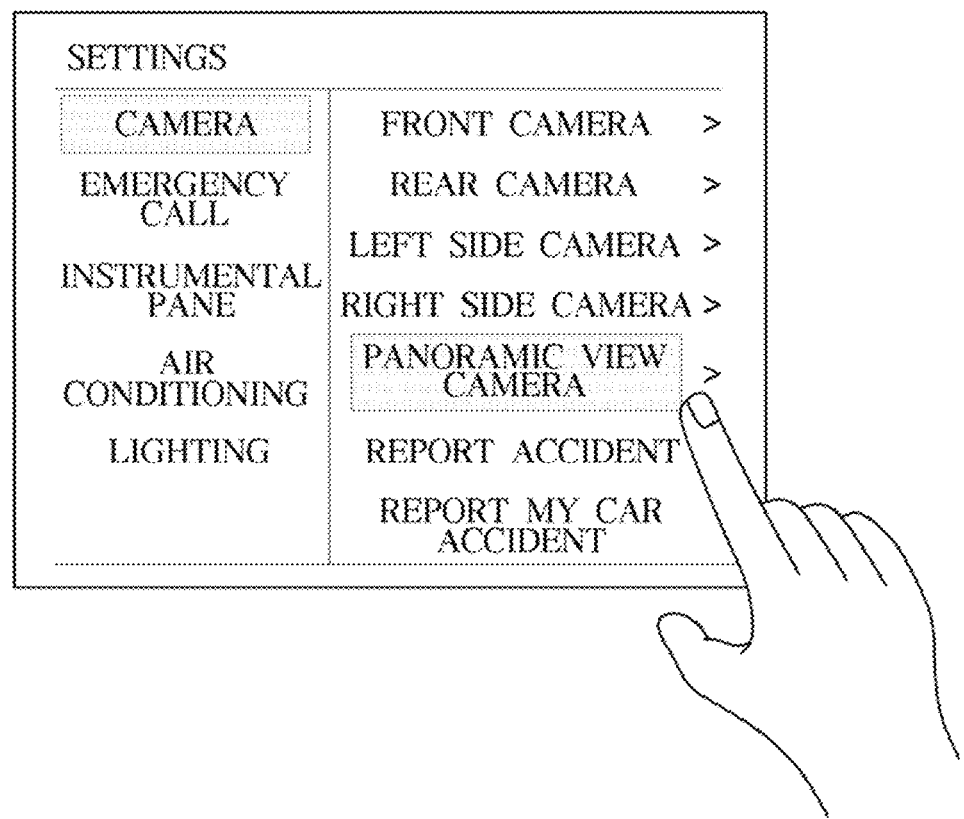
FIG. 14A and FIG. 14B are diagrams illustrating an example of taking a panorama photo in a vehicle according to an exemplary embodiment of the present disclosure.
Figure 14B:
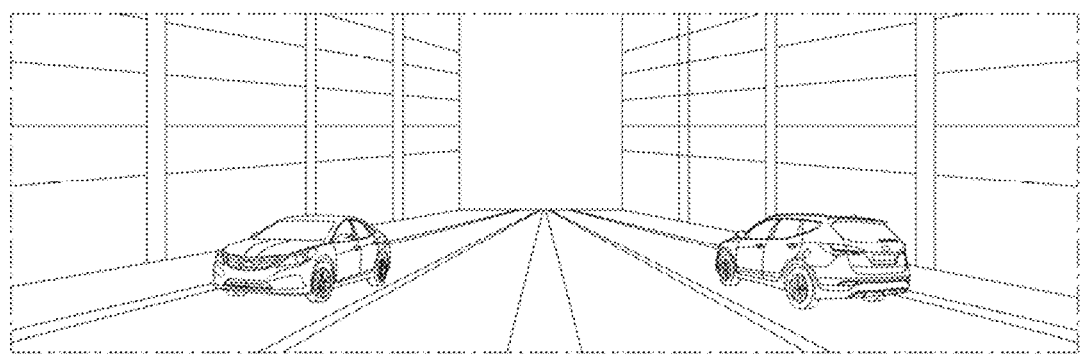

FIG. 14A and FIG. 14B are diagrams illustrating an example of taking a panorama photo in a vehicle according to an exemplary embodiment of the present disclosure.

As shown in FIG. 14A, to take a panorama photo, a user may select a 'panoramic view camera' menu which is a sub-menu of a 'camera' menu, on a user interface for camera control displayed on a multimedia device of the vehicle 100 or the mobile device 480 of the user. In the present instance, the user may select a portion of or all of the plurality of cameras 452 to take a panorama photo. As shown in FIG. 14B, the photographed images taken by the part of or all of the cameras 452 may be stitched into a single image, and the result image may be stored in the memory 456 provided in the vehicle 100 or transmitted to the mobile device 480.

As is apparent from the above, according to the exemplary embodiments of the present disclosure, the vehicle and the control method thereof can increase a shooting angle (shootable range) of a camera mounted on the vehicle, photographing without limitation of the shooting angle.

Also, the vehicle and the control method thereof can photograph surroundings of the vehicle while driving and transmit the photographed image to where the photographed image is required, easily providing a user with information related to emergency around the vehicle while driving.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a vehicle including at least one camera, the method comprising:
adjusting a shooting direction of the at least one camera to a target direction through adjustment of the at least one camera and controlling the at least one camera to photograph in the adjusted shooting direction; and
when the shooting direction is not adjusted to the target direction through the adjustment of the at least one camera, adjusting a direction of a vehicle body through independent adjustment of at least one of a rotation direction of each of vehicle wheels, a steering direction and a ground clearance of the vehicle to further adjust the shooting direction of the at least one camera to the target direction, and controlling the at least one camera to photograph in the further adjusted shooting direction,
wherein the adjustment of the at least one camera is performed through a user interface provided in the vehicle for camera control, and wherein the adjusting of the direction of the vehicle body is performed through another user interface provided in the vehicle for vehicle body control.

2. The method of controlling claim 1,
wherein the adjusting of the direction of the vehicle body includes at least one of a parallel direction adjustment to a ground where the vehicle is located and a vertical direction adjustment to the ground, and
wherein the parallel direction adjustment is performed, through the independent adjustment of the rotation direction of each of the vehicle wheels and the steering direction, and
wherein the vertical direction adjustment is performed, through the independent adjustment of the ground clearance at a position of each of the vehicle wheels.

3. The method of controlling claim 1, further including:
when the photographing is complete, storing, by the controller, a photographed image in the vehicle, transmitting, by the controller, the photographed image to a mobile device connected to the vehicle, or transmitting, by the controller, the photographed image to a server placed in a predetermined location.

4. A vehicle, comprising:
at least one camera; and
a controller configured to adjust a shooting direction of the at least one camera to a target direction through adjustment of the at least one camera and control the at least one camera to photograph in the adjusted shooting direction, and when the shooting direction is not adjusted to the target direction through the adjustment of the at least one camera, adjust a direction of a vehicle body through independent adjustment of at least one of a rotation direction of each of vehicle wheels, a steering direction and a ground clearance of the vehicle to further adjust the shooting direction of the at least one camera to the target direction, and control the at least one camera to photograph in the further adjusted shooting direction,
wherein the adjustment of the at least one camera is performed in response to an operation of a user interface provided in the vehicle for camera control, and
wherein the adjusting of the direction of the vehicle body is performed in response to an operation of another user interface provided in the vehicle for vehicle body control.

5. The vehicle of claim 4,
wherein the adjusting of the direction of the vehicle body includes at least one of a parallel direction adjustment to a ground where the vehicle is located and a vertical direction adjustment to the ground, and
wherein the parallel direction adjustment is performed, through the independent adjustment of the rotation direction of each of the vehicle wheels and the steering direction, and
wherein the vertical direction adjustment is performed, through the independent adjustment of the ground clearance at a position of each of the vehicle wheels.

6. The vehicle of claim 4, wherein, when the photographing is complete, the controller is further configured to store a photographed image in the vehicle, transmit the photographed image to a mobile device connected to the vehicle, or transmit the photographed image to a server placed in a predetermined location.

7. A method of controlling a vehicle including at least one camera, the method comprising:
adjusting, by a controller, a shooting direction of the at least one camera to a target direction through adjustment of the at least one camera and controlling, by the controller, the at least one camera to photograph in the adjusted shooting direction;
when the shooting direction is not adjusted to the target direction through the adjustment of the at least one camera, adjusting, by the controller, a direction of a vehicle body through independent adjustment of at least one of a rotation direction of each of vehicle wheels, a steering direction and a ground clearance of the vehicle to further adjust the shooting direction of the at least one camera to the target direction;
photographing, by a controller, surroundings of the vehicle using the at least one camera in the further adjusted shooting direction; and
transmitting, by the controller, a photographed image to a predetermined receiving destination using a wireless communication of the vehicle,
wherein the adjustment of the at least one camera is performed through a user interface provided in the vehicle for camera control, and
wherein the adjusting of the direction of the vehicle body is performed through another user interface provided in the vehicle for vehicle body control.

8. The method of controlling claim 7, further including:
adjusting, by the controller, the shooting direction of the at least one camera to the target direction before the photographing.

9. The method of claim 8, wherein when the shooting direction is not adjusted to the target direction through the adjustment of the at least one camera, the controller is further configured to adjust the direction of the vehicle body through the independent adjustment of at least one of the rotation direction of each of the vehicle wheels, the steering direction and the ground clearance of the vehicle to further adjust the shooting direction of the at least one camera to the target direction, and control the at least one camera to photograph in the further adjusted shooting direction.

10. The method of claim 9,
wherein the adjusting of the direction of the vehicle body includes at least one of a parallel direction adjustment to a ground where the vehicle is located and a vertical direction adjustment to the ground, and
wherein the parallel direction adjustment is performed, through the independent adjustment of the rotation direction of each of the vehicle wheels and the steering direction, and
wherein the vertical direction adjustment is performed, through the independent adjustment of the ground clearance at a position of each of the vehicle wheels.

11. The method of controlling claim 7, wherein the predetermined receiving destination is at least one of a social networking service, an application for reporting an illegal act, and a fire rescue service.

12. A vehicle, comprising:
at least one camera; and
a controller configured to adjust a shooting direction of the at least one camera to a target direction through adjustment of the at least one camera and control the at least one camera to photograph in the adjusted shooting direction, and when the shooting direction is not adjusted to the target direction through the adjustment of the at least one camera, adjust a direction of a vehicle body through independent adjustment of at least one of a rotation direction of each of vehicle wheels, a steering direction and a ground clearance of the vehicle to further adjust the shooting direction of the at least one camera to the target direction, and control the at least one camera to photograph surroundings of the vehicle using the at least one camera in the further adjusted shooting direction, and transmit a photographed image to a predetermined receiving destination using a wireless communication of the vehicle, wherein the adjustment of the at least one camera is performed in response to an operation of a user interface provided in the vehicle for camera control, and wherein the adjustment of the direction of the vehicle body is performed in response to an operation of another user interface provided in the vehicle for vehicle body control.

13. The vehicle of claim 12, wherein the controller is configured to adjust the shooting direction of the at least one camera before the photographing.

14. The vehicle of claim 12, wherein the predetermined receiving destination is at least one of a social networking service, an application for reporting an illegal act, and a fire rescue service.

\* \* \* \* \*